2,969,320

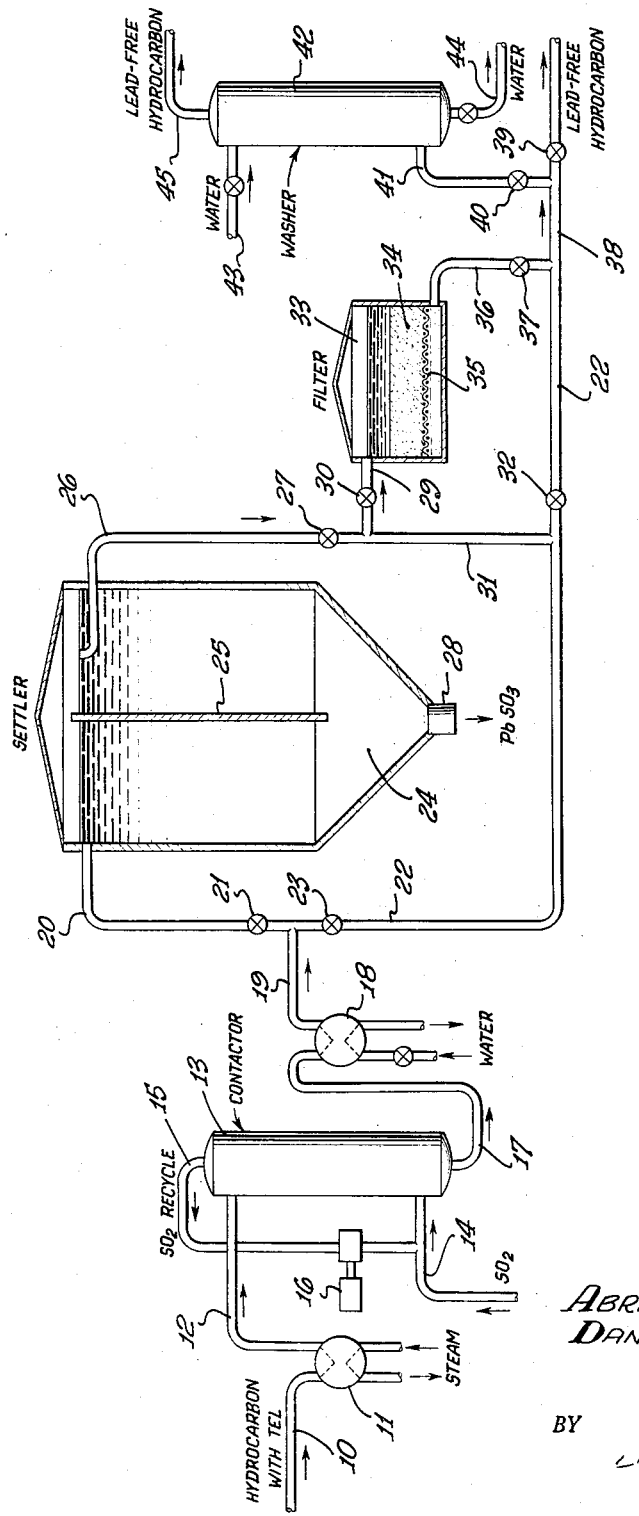

REMOVAL OF TETRAETHYL LEAD FROM HYDROCARBON LIQUIDS WITH SULFUR DIOXIDE

Abraham Shapiro, Pasadena, and Dan A. H. Olson, Huntington Park, Calif., assignors to Socony Mobil Oil Company, Inc., New York, N.Y., a corporation of New York Filed Feb. 3, 1959, Ser. No. 790,869

5 Claims. (Cl. 208—251)

This invention relates to removal of tetraethyl lead from gasoline and other hydrocarbon liquids.

Removal of lead from hydrocarbon materials is desirable under certain circumstances. In petroleum refineries it is customary to collect the various oils which have become contaminated or otherwise fail to meet product specifications and to add the mixture thus obtained to the charge stocks for refinery operations. Lead is very damaging to the activity of platinum employed as a catalyst; consequently, when the refinery operations include platinum reforming or a similar process, it is necessary to systematically exclude leaded gasoline from the slop oil or to provide means for removing lead from the material.

When a vessel which has been used for storage of leaded gasoline or a tetraethyl-lead concentrate is emptied, the liquid which remains on the interior surfaces is dangerously toxic. It is therefore desirable to remove the tetraethyl lead or to convert it into a relatively nontoxic substance before workmen enter the vessel.

In areas which are remote from centers of population and which are devoted to ranching, lumbering, mining, resort use, etc., there is need for considerable quantities of unleaded gasoline as fuel for appliances such as stoves, lanterns, and blowtorches. However, the amount needed is not great enough to justify transporting and storing unleaded gasoline in tank-truck quantities. Shipment of appliance fuel in small containers has increased its cost to the consumer and has led to frequent exhaustion of stocks available in an area. Similar problems arise in military operations; consequently there has been much research aimed at finding practical methods of removing tetraethyl lead from the leaded gasoline available everywhere as a motor fuel.

The methods which have been devised heretofore include bringing the leaded gasoline into contact with silica gel or acid-activated bentonite, thermal decomposition in the vapor state followed by deposition of metallic lead on steel wool, and chemical treatment with stannic chloride or nitrogen dioxide.

We have discovered that tetraethyl lead can be successfully and economically removed from a hydrocarbon liquid by injection of gaseous sulfur dioxide into the liquid. This results in the formation of a fine, grayish precipitate of lead sulfite. Identification of the other products of the reaction is obscured by side reactions and by the complex nature of the solvent liquids, but it is believed that the primary reaction proceeds essentially in accordance with the equation:

$$Pb(C_2H_5)_4 + 3SO_2 \rightarrow PbSO_3 + C_4H_{10} + C_4H_9SO_3H + S$$

A few samples of treated hydrocarbon liquids were tested for sulfur content after separation of the lead sulfite and removal of unreacted sulfur dioxide and water-soluble reaction products. These samples were not found to differ significantly in sulfur content from control samples untreated with sulfur dioxide.

The above equation calls for reaction of 0.98 gram of sulfur dioxide for each milliliter of tetraethyl lead, but in practice a considerable excess of sulfur dioxide over the theoretical quantity is needed for a fully effective reaction. At atmospheric temperature and up to about 125° F., it is useful to employ as much as twelve times the theoretical quantity. At somewhat higher temperatures less $SO_2$ is needed; at 160° F. little or no improvement in results was observed when more than two or three times the theoretical quantity was used. Temperatures much greater than 160° F. should ordinarily be avoided in order not to encourage undesirable side reactions with olefinic constituents of the hydrocarbon liquids, and in order to conduct the reaction at moderately low pressure without loss of hydrocarbon vapor.

Although lead sulfite is an insoluble substance of high density, it is slow to settle out of a hydrocarbon liquid treated with sulfur dioxide. At least in part, this is because of the extremely small size of the particles of lead sulfite. A possible additional cause is that the reaction between tetraethyl lead and sulfur dioxide is not rapidly completed. When the reaction is conducted at higher temperatures, the separation proceeds more rapidly, but we have not ascertained to what extent this is because the reaction rate is increased and to what extent it is because higher temperatures promote formation of larger particles of the precipitate.

If separation of the lead in a short time is desired, it can be achieved by filtering the treated hydrocarbon liquid through an inert solid material in a state of very fine subdivision. This filtration step is not to be confused with the known method, mentioned above, of removing unreacted tetraethyl lead from gasoline by means of silica gel or activated bentonite. In that method relatively large quantities of the solid agent are needed for removal of a small amount of lead and the agent soon loses its activity and must be replaced. A filter bed employed for removal of lead from a liquid treated with sulfur dioxide does not lose effectiveness until it becomes clogged with deposits of lead sulfite.

Samples of gasoline and kerosene having added tetraethyl lead were experimentally treated with sulfur dioxide by placing the samples in stoppered vessels, injecting gaseous $SO_2$ into the samples, determining the amount of added $SO_2$ by observing the increase in weight of the samples, permitting the treated samples to stand for various lengths of time while settling occurred, and then testing the liquids for lead content. The gasoline and kerosene were commercial products manufactured from California petroleum and had the properties shown in Table I.

*Table I*

|  | Gasoline | Kerosene |
|---|---|---|
| Gravity, A.P.I., degrees | 52.5 | 42.2 |
| Vapor pressure @ 100° F., p.s.i.a. | 11 | |
| Distillation range, ° F.: | | |
| Initial | 86 | 260 |
| 10% | 120 | 388 |
| 50% | 182 | 422 |
| 90% | 355 | 463 |
| End point | 420 | 500 |

The kerosene was a predominantly paraffinic material incuding some naphthenes. The gasoline, being a product of catalytic cracking and reforming processes, included substantial quantities of aromatic hydrocarbons and some olefins.

A number of the samples were treated with enough sulfur dioxide to form saturated solutions of the gas, which required quantities in the neighborhood of 1% by weight of sulfur dioxide with respect to the liquid. Other samples were treated with smaller quantities of sulfur dioxide or with none. The reactions were conducted at the temperatures indicated in Tables II and III and at atmospheric pressure or at the vapor pressure of the liquid at the reaction temperature, whichever was greater. The first six samples in Table II were washed with water of about pH 8.0 after the settling period and then tested for sulfur content.

the results of experiments on the effect of filtration on samples of treated and untreated leaded gasoline. The material referred to as "silica-alumina" in the table consists of catalyst fines discarded from a Thermofor catalytic cracking unit, in which the catalyst is a moving bed of pellets of a silica-alumina composition. The catalyst fines used as the filtration medium had been subjected to the regeneration step in which carbonaceous deposits are burned off. "Florex" is a modified fuller's earth manufactured by The Floridin Company, Tallahassee, Florida.

It will be noted that the silica-alumina catalyst fines and "Florex" gave excellent results even when the filtration rate was 20 volumes per hour per volume, and that the latter was only fairly successful when the filtration rate was increased to 30. Diatomaceous earth and fuller's earth yielded fair results with a filtration rate of 20, and the latter was completely successful when the filtra- Table II

| Hydrocarbon liquid | TEL, ml./gal. | Amount of SO₂, percent of saturation | Temperature, Fahr., degrees | Settling time | Analyses of liquid after settling | |
|---|---|---|---|---|---|---|
| | | | | | Lead, as TEL in ml./gal. | Sulfur, percent by weight |
| Gasoline | 2.56 | None | 75 | 72 hours | 2.56 | 0.15 |
| Do | 2.56 | 100 | 75 | do | 0.15 | 0.09 |
| Do | 2.56 | 100 | 75 | do | 0.09 | 0.15 |
| Do | 2.56 | 100 | 75 | do | 0.08 | 0.10 |
| Kerosene | 2.74 | None | 85 | do | 2.74 | 0.03 |
| Do | 2.74 | 100 | 85 | do | Nil | 0.07 |
| Do | 2.74 | None | 155 | 10 min | 2.74 | |
| Do | 2.74 | 100 | 125 | do | 2.33 | |
| Do | 2.74 | 100 | 135 | do | 2.17 | |
| Do | 2.74 | 100 | 150 | do | 1.83 | |
| Do | 2.74 | 100 | 155 | do | 1.35 | |
| Do | 2.74 | 100 | 160 | 4 hours | 0.56 | |
| Do | 2.74 | 30 | 160 | do | 0.54 | |
| Do | 2.74 | 25 | 160 | do | 0.66 | |
| Do | 2.74 | 20 | 160 | do | 0.50 | |
| Do | 2.74 | 15 | 160 | do | 0.73 | |
| Do | 2.74 | 100 | 85 | 22 hours | 0.29 | |

Table III

| Hydrocarbon liquid | TEL, ml./gal. | Amount of SO₂, percent of saturation | Temperature, Fahr., degrees | Initial settling time in hours | Lead after initial settling time, as TEL in ml./gal. | Added settling time in hours | Temperature Fahr., degrees | Lead after added settling time, as TEL in ml./gal. |
|---|---|---|---|---|---|---|---|---|
| Gasoline | 2.25 | 100 | 100 | 20 | 0.23 | 24 | 75 | Nil |
| Do | 2.25 | 30 | 100 | 20 | 1.59 | 24 | 75 | 0.71 |
| Do | 2.25 | 25 | 100 | 20 | 1.86 | 24 | 75 | 1.23 |
| Do | 2.25 | 20 | 100 | 20 | 1.92 | 24 | 75 | 1.38 |
| Do | 2.25 | 15 | 100 | 20 | 2.00 | 24 | 75 | 1.56 |
| Do | 2.25 | 100 | 125 | 20 | 0.11 | 24 | 75 | Nil |
| Do | 2.25 | 35 | 125 | 20 | 1.11 | 24 | 75 | 0.65 |
| Do | 2.25 | 25 | 125 | 20 | 1.25 | 24 | 75 | 0.83 |
| Do | 2.25 | 15 | 125 | 20 | 1.89 | 24 | 75 | 1.21 |

In the case of these samples the amount of SO₂ required for saturation was from about 11 to 13 times the theoretical quantity required for reaction with the tetraethyl lead present in the samples.

For most purposes, if any removal of tetraethyl lead is wanted, it is desirable that the removal be complete or nearly so. Therefore it is ordinarily preferable to use sulfur dioxide in amount sufficient to saturate the hydrocarbon liquid, to employ settling times of at least two or three days, and (if convenient) to employ temperatures of 125° to 150° F. For some purposes, however, complete removal of lead is not needed. For example, certain gasoline engines, mostly small, one-cylinder models designed to operate on fuel of relatively low octane rating, do not function well when supplied with the highly leaded gasoline prepared for use in vehicles, but such engines may operate satisfactorily on vehicle fuel from which only a portion of the tetraethyl lead has been removed.

The removal of lead can be greatly accelerated by filtering the hydrocarbon liquid, after treatment with sulfur dioxide, through a very finely divided solid material such as a clay or diatomaceous earth. Table IV reports tion rate was reduced to 5. Glass wool, cotton, and filter paper were too coarse in texture to be successful.

When the method is conducted on a small scale, as for conversion of leaded vehicle fuel into appliance fuel, a simple batch operation is preferable. Sulfur dioxide may be drawn from a cylinder or gas generator and injected into a drum or other vessel containing leaded gasoline and then, with or without a prolonged settling period, the treated liquid may be withdrawn from the vessel through a filter packed with clay or a similar material.

When the method is employed for decontamination of vessels which have contained liquids bearing tetraethyl lead, it is convenient to inject gaseous sulfur dioxide into the vessel and, after a period of a few hours, to introduce gaseous ammonia to neutralize the sulfur dioxide. The vessel may then be flushed out with a spray of water.

When large quantities of a lead-bearing hydrocarbon liquid require treatment, it may be worth while to set up equipment for a continuous form of the process, as described in the following.

Table IV

| Initial TEL content of gasoline, ml./gal. | Amount of SO₂, percent of saturation | Settling time | Temperature, Fahr., degrees | Filtering medium | Space velocity, Vol./hour/vol. | Lead content of filtrate, as TEL in ml./gal. |
|---|---|---|---|---|---|---|
| 2.68 | 0 | | 70 | Silica-alumina | 20 | 2.58 |
| 2.25 | 0 | | 70 | ------do------ | 20 | 1.86 |
| 2.68 | 100 | 16 hours | 70 | ------do------ | 20 | Nil |
| 2.84 | 100 | 5 min | 70 | ------do------ | 20 | 0.08 |
| 2.84 | 100 | 5 min | 120 | ------do------ | 20 | Nil |
| 2.84 | 0 | | 65 | Fuller's earth | 20 | 2.40 |
| 2.84 | 100 | 5 min | 65 | ------do------ | 5 | Nil |
| 2.84 | 100 | 5 min | 65 | ------do------ | 20 | 1.18 |
| 2.84 | 100 | 5 min | 120 | ------do------ | 20 | 0.98 |
| 2.25 | 0 | | 70 | "Florex" | 30 | 2.24 |
| 2.25 | 0 | | 70 | ------do------ | 20 | 2.30 |
| 2.25 | 0 | | 70 | ------do------ | 20 | 2.19 |
| 2.25 | 100 | 5 min | 70 | ------do------ | 20 | 0.11 |
| 2.25 | 100 | 5 min | 70 | ------do------ | 30 | 1.19 |
| 2.25 | 100 | 5 min | 110 | ------do------ | 30 | 0.70 |
| 2.84 | 100 | 5 min | 120 | Diatomaceous earth | 20 | 1.11 |
| 2.84 | 100 | 5 min | 65 | Cotton | 20 | 2.52 |
| 2.84 | 100 | 5 min | 120 | ------do------ | 20 | 2.50 |
| 2.84 | 100 | 5 min | 65 | Glass wool | 20 | 2.64 |
| 2.84 | 100 | 5 min | 120 | ------do------ | 20 | 2.56 |
| 2.84 | 100 | 5 min | 70 | Filter paper | | 2.56 |
| 2.84 | 100 | 5 min | 120 | ------do------ | | 2.52 |
| 2.25 | 100 | 5 min | 70 | ------do------ | | 2.26 |
| 2.25 | 100 | 5 min | 110 | ------do------ | | 2.06 |
| 2.68 | 100 | 16 hrs | 70 | ------do------ | | 0.58 |

The single figure of the drawing is a flow diagram illustrating a form of the invention suitable for industrial use.

Referring to the drawing, a hydrocarbon liquid containing tetraethyl lead, for example a refinery slop oil, is introduced by line 10 and passed through heater 11 where its temperature is raised to 125° to 150° F. by heat exchange with steam or other heated fluid. From the heater the liquid passes by line 12 to the upper portion of vessel 13 wherein it is brought into contact with gaseous sulfur dioxide introduced by line 14 and caused to bubble through one or more bodies of the liquid. Undissolved sulfur dioxide is withdrawn from the top of the contacting vessel and returned to inlet line 14 by means of recycle line 15 and pump 16.

Hydrocarbon liquid saturated with sulfur dioxide is withdrawn from the lower portion of vessel 13 by line 17 and passed to cooler 18 where its temperature is reduced to approximately atmospheric. If the liquid being treated is one of low vapor pressure, the water supply to cooler 18 may be shut off and the cooling step thereby eliminated.

The liquid is taken from cooler 18 by line 19 which branches into line 20 controlled by valve 21 and line 22 controlled by valve 23. Line 20 discharges into the upper portion of one side of settling vessel 24 which is partially divided into two compartments by vertical barrier 25 in such manner as to cause the liquid in the vessel to move slowly in a U-shaped path. Liquid at least partially freed of lead is withdrawn from the upper portion of the other side of settling vessel 24 by line 26 controlled by valve 27, and from time to time precipitated lead sulfite is removed from the vessel through bottom port 28.

The settling vessel is sufficiently large in size that, when the process is operating at normal capacity, it requires a period of two or three days for a particular portion of the liquid to complete its journey through the vessel.

Line 26 branches into line 29 controlled by valve 30 and line 31 which joins bypass line 22, the latter being provided with valve 32 downstream from the confluence. Line 29 leads to filtration vessel 33 wherein a bed of clay 34 rests on a foraminous support 35. Filtered liquid passes by line 36, controlled by valve 37, into discharge line 38, which is connected also with bypass line 22.

When the process is operating at normal capacity or less, the liquid withdrawn from settling vessel 24 is free of lead and the filtration step performs no function. At such times filter vessel 33 may be cut out of the system by closing valves 30 and 37 and opening valve 32. When the operation is at greater than normal capacity, the liquid from settling vessel 24 may contain small amounts of lead which can be removed by filtration; in such cases valves 30 and 37 are opened and valve 32 is closed. Under some circumstances, as for example in the event of temporary operation at such a high rate that previously settled lead sulfite in vessel 24 might be picked picked up by the flow of liquid, it may be desirable to bypass the settler and to rely upon filtration alone. This is accomplished by closing valves 21, 27, and 32 and opening valves 23, 30, and 37. It is preferable, however, to remove as much of the lead as is conveniently possible by settling rather than by filtration in order to avoid unnecessary clogging of the filter bed.

It may be desirable to remove sulfur dioxide and water-soluble reaction products such as sulfonic acid from the treated hydrocarbon. If so, valve 39 is closed and valve 40 is opened, so that the liquid passes by line 41 into scrubbing vessel 42, wherein a body of water alkalized by the addition of up to one percent of NaOH or the equivalent is maintained. Fresh alkaline water may be continuously or periodically introduced to the scrubbing vessel by line 43 while spent solution is withdrawn by line 44. The hydrocarbon liquid, free of lead and added sulfur, is taken from the treating unit by line 45.

We claim as our invention:

1. The method of removing tetraethyl lead from a hydrocarbon liquid which comprises: bringing said liquid into contact with gaseous sulfur dioxide under conditions capable of causing a substantial degree of solution of said sulfur dioxide in said liquid, whereby tetraethyl lead is decomposed and a lead-bearing precipitate is formed.

2. The method of removing tetraethyl lead from a hydrocarbon liquid which comprises: bringing said liquid into contact with gaseous sulfur dioxide under conditions capable of causing a substantial degree of solution of said sulfur dioxide in said liquid, whereby tetraethyl lead is decomposed and a lead-bearing precipitate is formed, and separating said precipitate from said liquid.

3. The method of removing tetraethyl lead from a hydrocarbon liquid which comprises: bringing said liquid into contact with gaseous sulfur dioxide under conditions capable of causing a substantial degree of solution of said sulfur dioxide in said liquid, whereby tetraethyl lead is decomposed and a lead-bearing precipitate is formed, separating said precipitate from said liquid, and washing said liquid with alkaline water to remove water-soluble sulfur compounds.

4. The method of removing tetraethyl lead from a hydrocarbon liquid which comprises: bringing said liquid into contact with gaseous sulfur dioxide under conditions capable of causing a substantial degree of solution of said sulfur dioxide in said liquid, whereby tetraethyl lead is decomposed and a lead-bearing precipitate is formed, and retaining said liquid in a quiescent body for a period of time sufficient for said precipitate to settle from said liquid.

5. The method of removing tetraethyl lead from a hydrocarbon liquid which comprises: bringing said liquid into contact with gaseous sulfur dioxide under conditions capable of causing a substantial degree of solution of said sulfur dioxide in said liquid, and passing said liquid through a filter comprising a permeable mass of solid material in a state of subdivision resembling that of clay.

References Cited in the file of this patent

UNITED STATES PATENTS

| | | |
|---|---|---|
| 2,368,261 | Neef | Jan. 30, 1945 |
| 2,448,235 | Rasmussen | Aug. 31, 1948 |
| 2,453,138 | Kharasch | Nov. 9, 1948 |
| 2,580,243 | Rifkin et al. | Dec. 25, 1951 |
| 2,651,594 | Blatz | Sept. 8, 1953 |
| 2,745,793 | Jezl et al. | May 15, 1956 |